United States Patent

[11] 3,581,918

| [72] | Inventor | Richard T. Fujioka |
| | | Oxford, Mich. |
| [21] | Appl. No. | 821,930 |
| [22] | Filed | May 5, 1969 |
| [45] | Patented | June 1, 1971 |
| [73] | Assignee | Fruehauf Corporation |
| | | Detroit, Mich. |
| | | Continuation-in-part of application Ser. No. |
| | | 697,427, Jan. 12, 1968. |

[54] RAILCAR-UNLOADING SYSTEM
14 Claims, 9 Drawing Figs.

| [52] | U.S. Cl. | 214/38, |
| | | 105/455 |
| [51] | Int. Cl. | B65g 67/02 |
| [50] | Field of Search | 214/38.1, |
| | | 38.8; 105/455, 368 B |

[56] References Cited
UNITED STATES PATENTS

| 2,843,276 | 7/1958 | Copeland | 214/38(.8) |
| 3,225,709 | 12/1965 | Francis | 105/455 |
| 3,143,979 | 8/1964 | Eckersall | 105/455 |

FOREIGN PATENTS

| 1,369,581 | 7/1964 | France | 214/38(.1) |

Primary Examiner—Robert G. Sheridan
Attorney—Harness, Dickey & Pierce

ABSTRACT: A railcar-unloading system comprising a wheeled vehicle such as a railroad flatcar or the like adapted to traverse a railroad track and having a generally flat horizontally extending cargo-supporting bed; an elongated, generally rectangular-shaped cargo-carrying container disposed on the cargo bed; means in the form of a plurality of pivotable and elevatable support mechanisms interposed between the lower side of the container and the upper side of the cargo bed and located one adjacent each of the four corners of the lower side of the container, whereby the container is adapted to the pivotably biased at each of the mechanisms between a transit position and a plurality of loading and/or unloading positions, and at least one transfer bridge assembly adapted to be selectively disposed at a support position extending outwardly from the cargo bed for supporting the cargo container when it is moved to and from its loading and/or unloading positions.

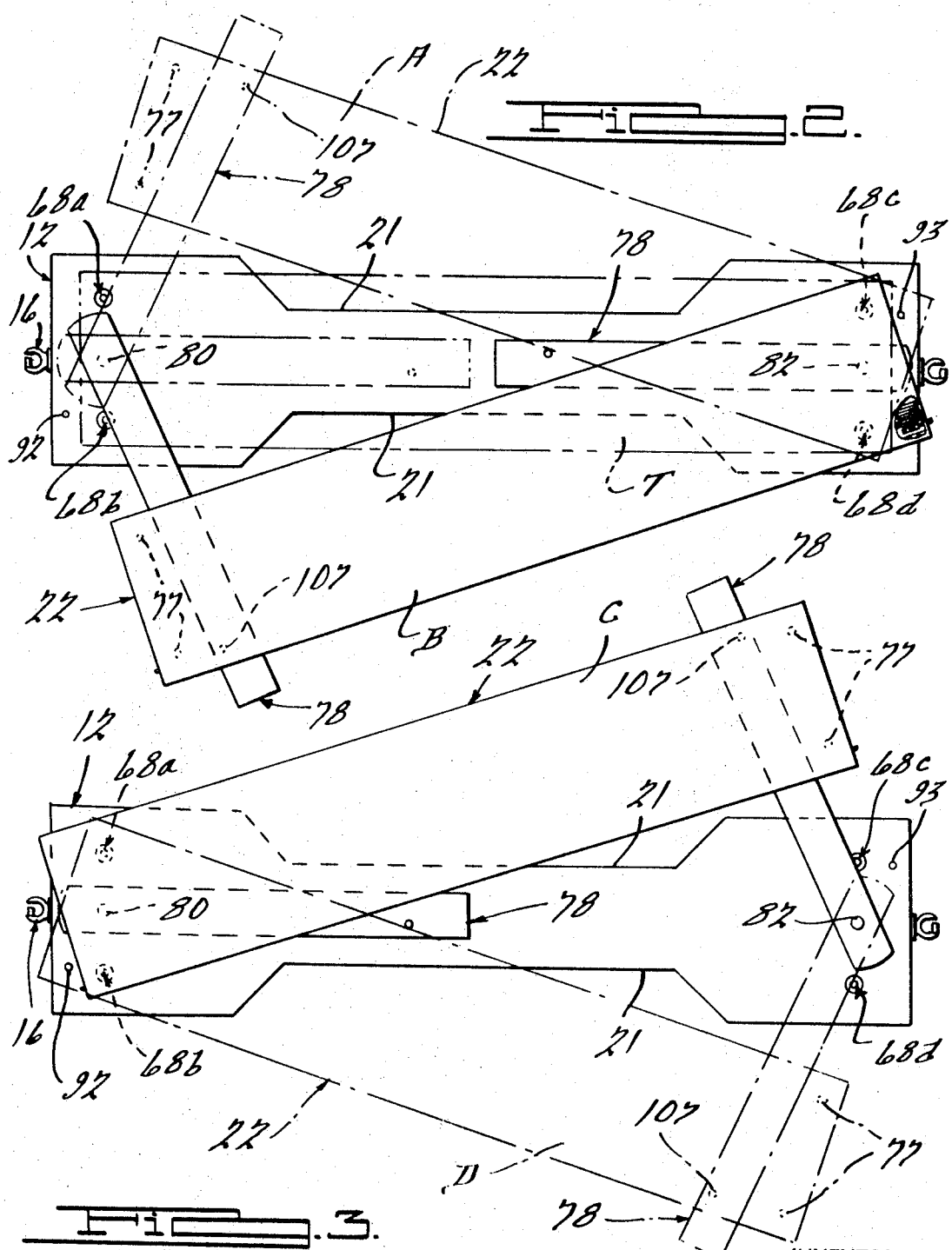

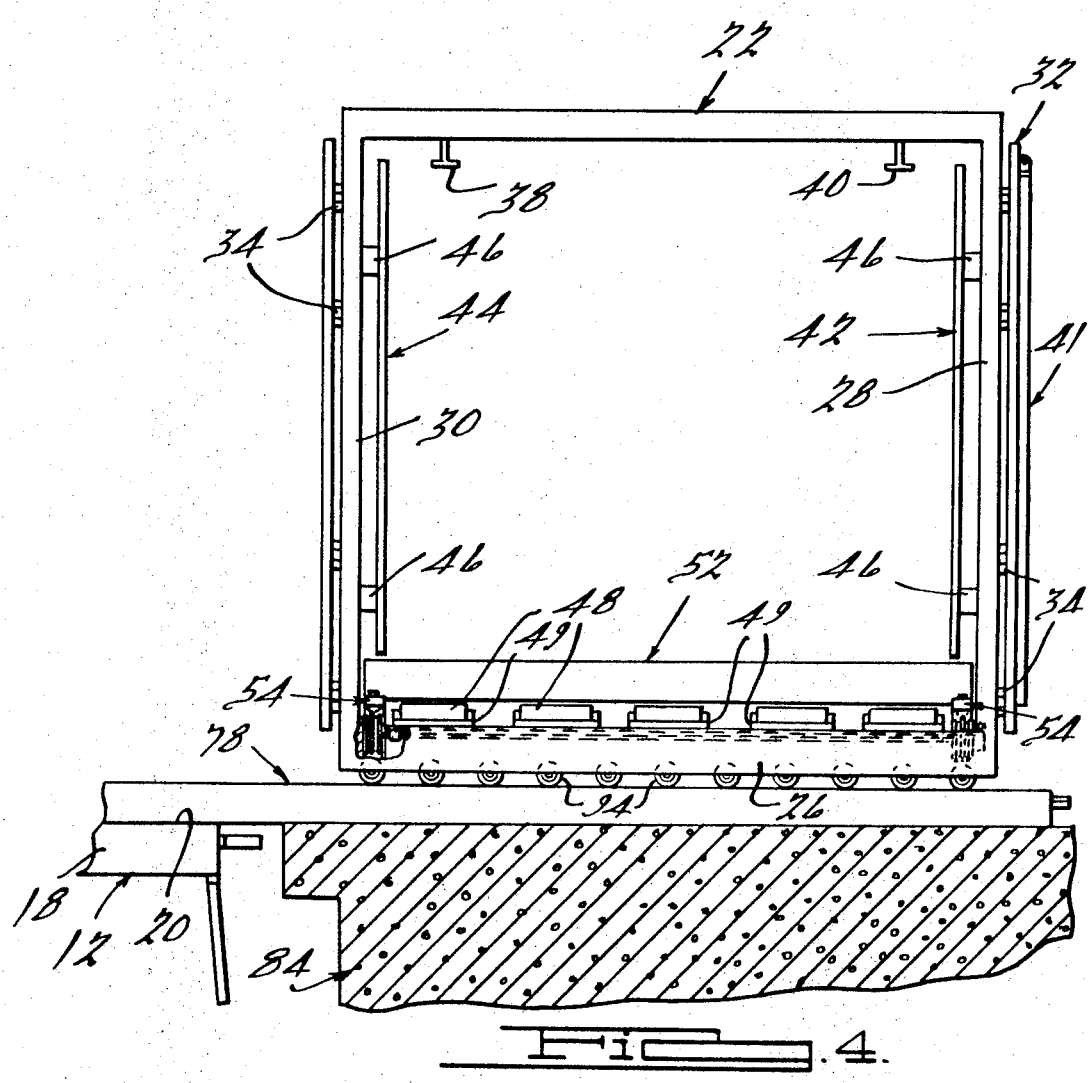
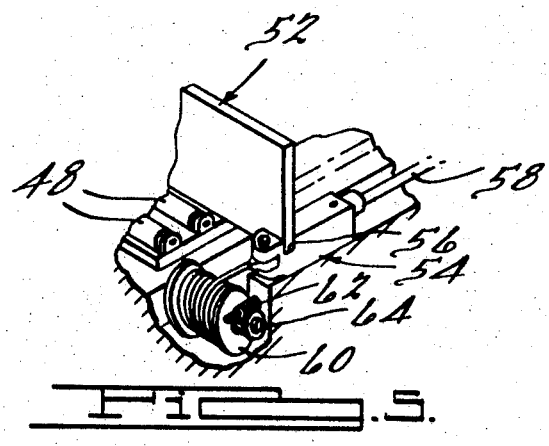

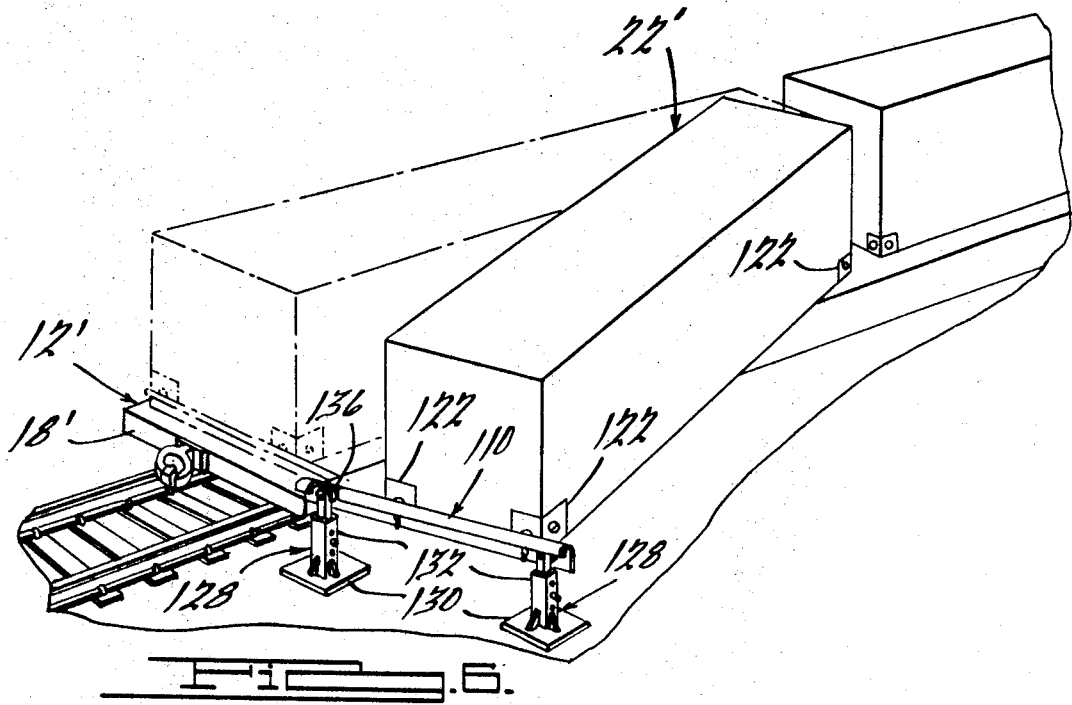
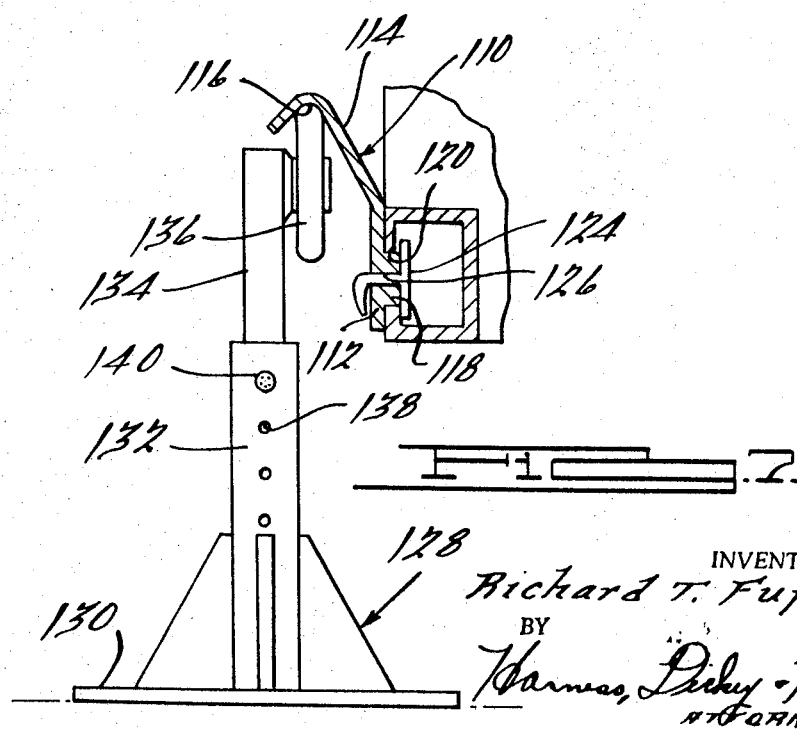

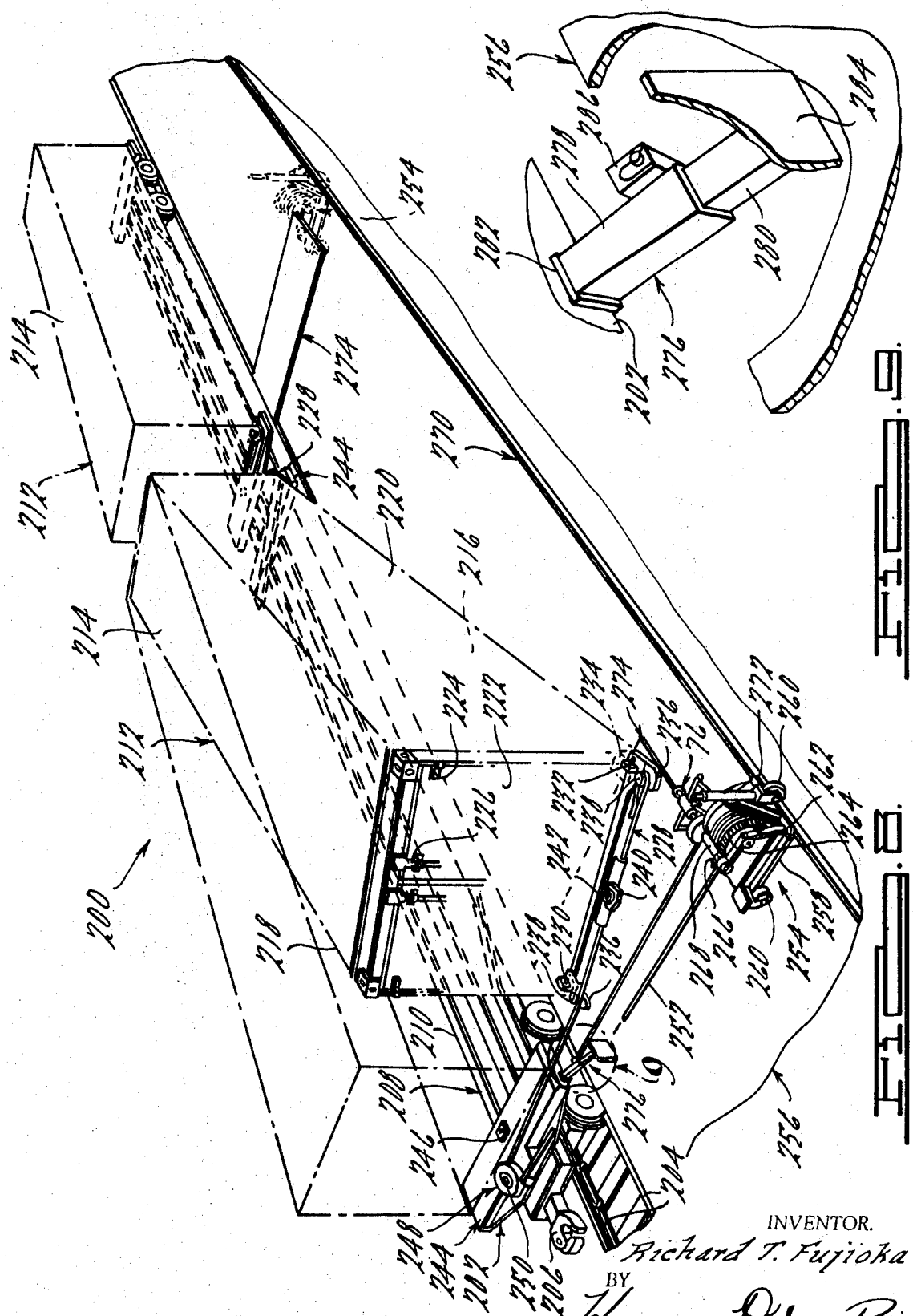

RAILCAR-UNLOADING SYSTEM

This application is a continuation-in-part of U.S. Pat. application, Ser. No. 697,427, filed Jan. 12, 1968, for Railcar-Unloading System.

BACKGROUND OF THE INVENTION

The continuously increasing practice of transporting goods by railroads in relatively large and bulky shipping containers has prompted the need for a loading and unloading system adapted to conveniently and expeditiously transfer such cargo to and from railway vehicles, such as freight cars, flat cars and the like. Generally speaking, the present invention is directed toward such a loading and unloading system for railroad vehicles, whereby relatively large cargo-carrying containers may be conveniently transferred to and from a railway car in a minimum amount of time and with a minimum amount of manual effort and attendant use of cargo-handling equipment such as lift trucks or the like. More particularly, the present invention is directed toward a railway-loading and -unloading system that utilizes a railway car having a generally flat, horizontally extending cargo bed, such as a flatcar, upon which is disposed an elongated, generally rectangular-shaped cargo container. The container is operatively supported on the railway car in a manner such that the container may be pivotably biased at one of several positions on the car, whereby one end of the container is pivoted or swung outwardly from the car to provide for access for end loading of the container. The means for operatively supporting the cargo container on the railway car is preferably, although not necessarily, in the form of four pivotable and elevatable support mechanisms that are interposed between the lower side of the container and the cargo bed of the car and located one adjacent each of the four corners of the lower side of the container. Each of these mechanisms is adapted to function in positively securing the container to the railway vehicle, as well as to provide pivot means enabling the container to be pivotably biased relative to the vehicle to and from a plurality of positions wherein convenient access is provided at one end or the other of the container. The pivot mechanisms are oriented such that either end of the container may be pivoted outwardly from the vehicle and in either direction relative thereto, with the result that end loading is provided at both ends of the container and at both sides of the railway vehicle, thus providing for universality of application.

In accordance with the present invention, the railway vehicle- and cargo-carrying container is provided with means for supporting the container when it is pivoted or swung to a loading or unloading position. In one form of the present invention, such support means is provided by a pair of transfer bridges pivotably mounted on the upper side of the railway car and adapted to be biased to various positions wherein the outer ends of the cargo container will be rigidly supported when they are disposed in any one of the loading or unloading positions. In another embodiment of the present invention, the cargo container is designed to have an elongated track or rail detachably secured to the end thereof which is to be end-loaded (or unloaded), the track being adapted to ride upon the upper ends of one or more elevatable dollies which are positioned adjacent the railway vehicle preparatory to the container being pivoted to some preselected loading or unloading position.

In yet another embodiment of the present invention, the cargo containers are adapted to be selectively biased between their respective transit positions and various loading and unloading positions by means of a winch assembly designed to ride along a guideway or track on the associated loading dock, with the winch assembly being connected to the containers through suitable tensioning cables.

In a preferred construction of the present invention, the cargo-carrying container is provided with means selectively movable therewithin for biasing cargo longitudinally within the container. Such means comprises a cargo-transferring blade or plate which is movable between the opposite ends of the container and is adapted to engage a portion of the cargo placed therewithin to move such cargo to a preselected longitudinal position within the container.

SUMMARY OF THE INVENTION

This invention relates generally to the vehicle-loading and -unloading art, and, more particularly to a new and improved method and apparatus for loading and unloading railway cars.

It is accordingly a general object of the present invention to provide a new and improved apparatus for loading and unloading vehicles and in particular railway freight cars.

It is a more particular object of the present invention to provide a new and improved apparatus of the above character which is designed to facilitate end loading of railway cars.

It is still a more particular object of the present invention to provide a new and improved rail car-unloading system comprising a wheeled flatcar having a cargo-carrying container adjustably mounted thereon, whereby the container may be selectively adjusted to any one of several positions wherein freight may be conveniently loaded and unloaded from one end thereof.

It is another object of the present invention to provide a system of the above character which includes one or more transfer bridges mounted on the railcar and adapted to be selectively moved to a position supporting the cargo container when the same is disposed in a loading or unloading position.

It is another object of the present invention to provide a railcar-unloading system of the above type wherein the bridges may be either mechanically or manually positioned relative to the railway car for supporting the cargo container in any of its loading or unloading positions.

It is a related object of the present invention to provide a railcar-unloading system of the above character wherein the transfer bridges comprise means for mechanically biasing the cargo container between a transit position and the various loading and unloading positions.

It is still another object of the present invention to provide a system of the above character wherein the cargo container comprises power means for biasing cargo longitudinally thereof toward or away from the end of the container at which cargo is being loaded or unloaded.

It is yet a further object of the present invention to provide a railcar unloading system of the above-described type which facilitates loading or unloading cargo at either end of the cargo container, as well as at either side of a railway car.

It is a further object of the present invention to provide a railcar-loading and -unloading system of the above character which utilizes a winch assembly which is adapted to traverse a longitudinally extending track on the loading dock and be connected to the cargo-carrying containers through suitable flexible cables or the like.

Other objects and advantages of the present invention will become apparent from the following detailed description, taken in conjunction with the accompanying drawings.

BRIEF DESCRIPTION OF THE DRAWINGS

FIG. 2 is a schematic plan view of the system shown in FIG. 1, illustrating two of the positions to which the cargo-carrying container may be moved;

FIG. 3 is a schematic plan view similar to FIG. 2 and illustrates two additional positions to which the cargo-carrying container may be moved;

FIG. 4 is an end elevational view of the railcar-unloading system illustrated in FIG. 1;

FIG. 5 is an enlarged fragmentary view of a portion of the cargo-transferring mechanism incorporated in the unloading system of the present invention;

FIG. 6 is an elevated perspective view, partially in phantom, of an alternate embodiment of the railcar-loading and unloading system of the present invention;

FIG. 7 is an enlarged end elevational view of a portion of the cargo-carrying container support means used for supporting the cargo container shown in FIG. 6 when the same is biased to a loading or unloading position;

FIG. 8 is an elevated perspective view of still another alternate embodiment of the railcar-loading and -unloading system of the present invention, and FIG. 9 is an enlarged elevated perspective view, partially broken away, of the portion of the structure shown within the circle 9 of FIG. 8.

DETAILED DESCRIPTION OF A PREFERRED EMBODIMENT

Figure 1:
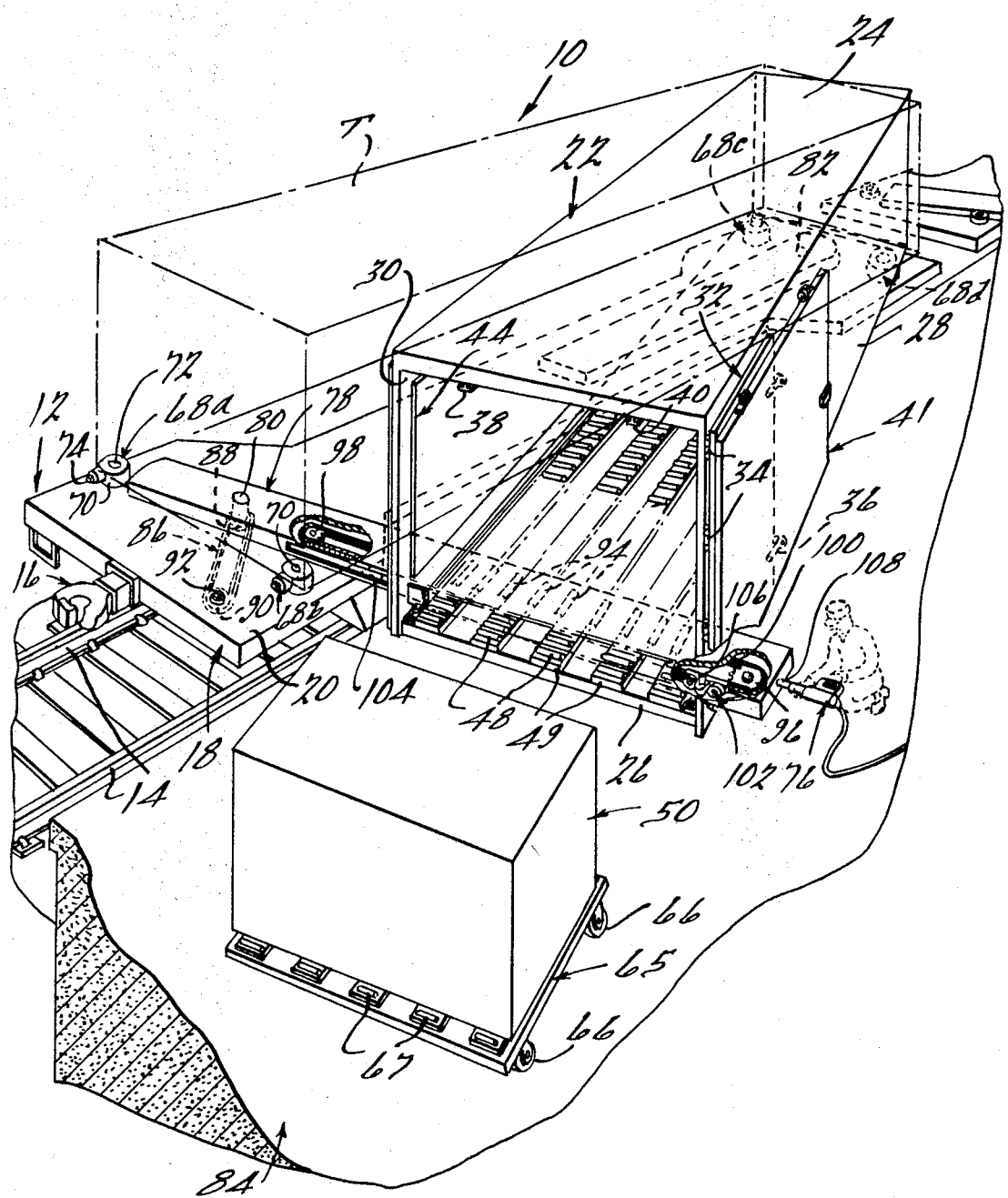
FIG. 1 is an elevated perspective view, partially in phantom, of a preferred construction of the railcar-loading and unloading system of the present invention.

For purposes of clarity of description, the terms "upwardly," "downwardly" and derivatives thereof will have reference to the uppermost and lowermost portions of the railway-loading and -unloading system shown in FIG. 1. Likewise, the terms "inwardly" and "outwardly" will have reference to the geometric center of the various components of the loading and unloading system of the present invention, as shown in FIG. 1.

Referring now in detail to the drawings, a railcar-loading and -unloading system 10, in accordance with a preferred embodiment of the present invention, is shown as comprising a wheeled vehicle in the form of a railcar 12 which is adapted to ride upon conventional railway tracks 14 and be operatively connected to similar or different type railcars in the usual manner through a suitable coupling arrangement 16. The car 12 is of the type generally known as a "flatcar" and comprises a horizontally extending cargo bed 18 which defines a generally flat or planar upper surface 20. As best illustrated in FIGS. 2 and 3, the cargo bed 18 may be of a reduced size or be cut away along the lateral sides thereof, as shown at 21, whereby to reduce the structural size and weight of the car 12. The loading and unloading system 10 of the present invention further comprises an elongated, generally rectangular-shaped cargo-carrying container 22 which is of a substantially torsionally rigid construction and comprises an upper side section or top 24, a lower side section or bottom 26, and a pair of vertically extending lateral side sections 28 and 30. The longitudinally opposite ends of the container 22 are adapted to be selectively closed by means of suitable closure panels or doors 32 which may be hingedly mounted on the container side sections 28, 30 by means of suitable hinges or the like 34 and be provided with conventional locking or latching mechanisms 36.

Generally speaking, and in accordance with the principles of the present invention, the cargo container 22 is adapted to be adjustably or movably secured to the cargo bed 18 of the railcar 12 in a manner such that the container 22 may be selectively biased between a transit position wherein the container is disposed directly above and longitudinally aligned with the cargo bed 18, as shown in phantom lines in FIG. 1, and any one of several loading or unloading positions, one of which is shown by the solid line representation of the container 22 of FIG. 1. More particularly, the container 22 is designed to be pivotably secured to the cargo bed 18 of the car 12 adjacent each of the four corners of the lower side section 26 thereof, whereby the container 22 may be pivoted about any one of the four corners thereof, as shown by the solid and phantom line positions of the container 22 in FIGS. 2 and 3, and as will hereinafter be described in detail.

The interior of the cargo container 22 may be provided with any suitable cargo-supporting and -bracing equipment in accordance with the size and type of cargo to be transported therewithin. By way of example, the container 22 is shown as being provided with a pair of spaced-parallel overhead tracks 38 and 40 which are fixedly secured to the lower side of the top 24 of the container 22 and are adapted to support one or more longitudinally movable freight- or cargo-supporting bulkheads 41 for longitudinal sliding movement interiorly of the container 22. When it is desired to load cargo into the container 22, at least one of the bulkheads 41 may be transferred from the overhead tracks 38, 40 and secured to the interior side of one of the doors 32, whereby when said one door 32 is pivoted to an open positions as shown in FIG. 1, the bulkhead 41 will be temporarily stored at a position so as to not interfere with the normal loading or unloading procedures. Also, by way of example, the lateral side sections 28 and 30 of the container 22 are shown as being provided with expandable sidewall panels or fillers 42 and 44, respectively, that are mounted on the interior surfaces of the side sections 28, 30 by means of suitable expandable or telescopic brackets or the like, generally designated by the numeral 46. As is well known in the art, the side fillers 42, 44 may be moved laterally inwardly and outwardly relative to the side sections 28, 30 of the container 22 in order to achieve proper bracing and lateral support of any cargo which may be transported therewithin. The interior of the container 22 is further provided with a plurality of antifriction rollers, generally designed 48, which are rotatably supported by means of a plurality of laterally spaced, longitudinally extending roller supports 49 mounted on the upper surface of the container bottom 26, whereby the rotational axis of each of the rollers 48 extends perpendicular to the longitudinal centerline of the container 22 so that cargo may be conveniently shifted longitudinally therewithin.

In order to facilitate loading and unloading cargo, such as the freight carton or box 50 illustrated in FIG. 1, to and from the container 22, and more particularly, for moving such cargo longitudinally within the container 22 once it has been placed therewithin, means is provided adjacent the lower side section or bottom 26 of the container 22 for mechanically moving the cargo longitudinally thereof. As best illustrated in FIGS. 4 and 5, such means is provided by a laterally and vertically extending cargo-transporting blade 52 which is supported at the opposite ends thereof by means of a pair of blade carrier members, generally designated 54. As shown in FIG. 5, the carrier members 54 are formed with downwardly extending recessed portions 56 on the upper sides thereof which are adapted to nestingly receive portions of the lower edge of the blade 52. Longitudinal adjustable movement of the blade 52 is achieved through the use of a plurality of flexible cables 58, each of which is adapted to have one end thereof secured to one end of one of the carrier members 54 and the opposite end thereof wound upon one of four drums, generally designed 60, which are rotatably mounted one at each of the four corners of the lower side of the container 22. Each of the drums 60 is provided with a suitable motor (not shown) which may be energized by any suitable source of electrical, pneumatic or hydraulic power, with each of the drive motors being operatively connected to its associated drum 60 by means of a suitable gear train or the like, such as the worm and pinion gears 62 and 64 illustrated in FIG. 5. It will be noted that the drums 60, cables 58 and blade carrier members 54 are disposed below the upper surface of the rollers 48, and further, that the blade 52 may be disengaged or removed from the recesses 56 of the carrier members 54 when it is not being used, with the result that cargo may be loaded or unloaded without any impedance or interference by the drums 60, carrier members 54 or cables 58.

During normal use of the cargo-transporting blade 52, the blade 52 is positioned adjacent the end of the container 22 through which cargo is being loaded. This is accomplished by energizing the drive motors associated with the drum 60 at the end of the container 22 toward or adjacent which the blade 52 is to be moved. The blade 52 may be temporarily removed from the carrier members 54 and the cargo, such as the carton 50, may be transported to a position adjacent the end of the container 22 by means of a suitable conveyor pallet 65 which may be provided with wheels or casters 66 on the lower side thereof and roller 67 on the upper surface thereof. The pallet 65 is moved into position adjacent the open end of the container 22 and the carton 50 is rolled off from the pallet 65 and onto the rollers 48 within the container 22. The carton 50 is positioned interiorly of the container 22 a sufficient distance to permit the blade 52 to be reinserted into the recessed portions 56 of the carrier members 54, at which time the drive motors associated with the drums 60 at the opposite end of the container 22 may be energized to effect longitudinal movement of the transporting blade 52, thereby causing longitudinal movement of the carton 50, as well as any other cargo previously loaded into the container 22, to some predetermined position within the container 22. Thereafter, the blade 52 may be properly positioned adjacent the loading end of the container 22 preparatory to loading additional cargo into the container 22. It will be readily apparent that when it is decided to unload cargo from within the container 22, the above procedure is merely reversed, and by virtue of the fact that the carrier members 54 are located below the rollers 48, when the blade 52 is removed from the members 54, said members 54 may be moved longitudinally of the container 22 below the cargo therein, whereby the blade 52 may be remounted on the members 54 at any desired position within the container 22. Thus, the blade 52 may be used to effect longitudinal movement of the cargo within the container 22 toward or away from either end thereof, as dictated by the attendant loading or unloading conditions.

As previously mentioned, in accordance with the principles of the present invention, the container 22 is adapted to be secured to the cargo bed 18 of the railcar 12 in a manner such that the container 22 may be pivotably biased from its transit position to any one of several loading positions shown in phantom lines in FIGS. 2 and 3. Means for thus supporting the container 22 on the railcar 12 is provided by four elevatable pivot mechanisms 68a, 68b, 68c and 68d which are fixedly mounted to the upper surface 20 of the cargo bed 18, one adjacent each of the four corners of the bottom 26 of the container 22. Each of the pivot mechanisms 68 comprises a generally annular enclosure 70 which is adapted to house an elevatable, generally cylindrical-shaped pivot hub 72. The pivot hubs 72 are adapted to be selectively raised and lowered relative to the associated enclosures 70 by means of suitable drive mechanisms (not shown) located interiorly of the enclosures 70, which drive mechanisms are designed to be actuated through a suitable drive shaft or the like 74 extending outwardly from each of the enclosures 70. Actuation of the drive mechanisms is achieved by engaging a portable or other suitable drive motor or tool, one of which is shown at 76 in FIG. 1, with the outer ends of the drive shafts 74, in a manner well known in the art.

During normal transit of the container 22 on the railway car 12, the pivot hub 72 of each of the mechanisms 68 is adapted to be disposed in an elevated or extended position extending upwardly from the upper sides of the enclosures 70 and received within suitable complementary shaped openings or bores 77 provided on the lower side of the bottom 26 of the container 22. The upper ends of the hubs 72 are preferably provided with some type of locking arrangement so as to lockingly engage the lower side of the container 22 when the hubs are extended. Thus, when the hubs are engaged with the container 22, said container 22 is positively secured to the upper side of the cargo bed 18, thereby providing against any movement of the container 22 relative to the railway car 12 during transit thereof. When it is desired to move the container 22 from its transit position to any one of the plurality of loading or unloading positions shown in FIGS. 2 and 3, all but one of the pivot mechanisms 68 are actuated in a manner so as to retract the pivot hubs 72 downwardly within the associated enclosures 70, the pivot hub 72 which remains extended or elevated thereby serving as the pivotal axis for the container 22. More particularly, in the event it is desired to pivot the container 22 to the phantom line position A shown in FIG. 2, the pivot hub 72 of the pivot mechanisms 68a, 68b and 68d are retracted, and the pivot hub 72 of the pivot mechanism 68c serves as the pivotal axis for biasing the container 22 to the position A. Similarly, when it is desired to move the container 22 to the phantom line position B in FIG. 2, all of the pivot hub members 72 are retracted with the exception of the hub member 72 of the mechanism 68d, and likewise, the pivot hub members 72 of the mechanisms 68a and 68b serve as the pivotal axis when the container 22 is positioned to the loading and unloading positions D and C, respectively, shown in FIG. 3. After the desired loading or unloading of the container 22 is completed, the container 22 is returned to its transit position, herein designated at T, at which time all of the pivot hub members 72 are elevated to positively engage the lower side of the container 22, thereby positively retaining the container 22 in its transit position during subsequent transport of the railcar 12.

A particularly important feature of the pivot mechanisms 68 resides in the fact that they may be selectively actuated so as to provide for gravity loading or unloading of the container 22. That is, when cargo is being unloaded from one end of the container 22, the mechanisms 68 adjacent the opposite end of the container 22 may be elevated so as to facilitate the movement of cargo toward the open end of the container 22 under the influence of gravity.

As best illustrated in FIGS. 1 through 4, the railcar-loading and -unloading system 10 of the present invention is provided with means for supporting the container 22 as it is moved between its transit position and the various loading or unloading positions. Such support means is preferably provided by a pair of identical, elongated rigid shiftable beams or transfer bridges, generally designated 78. The bridges 78 are pivotably secured at one end thereof to the upper sides of the cargo bed 18 by means of a pair of elevatable pivot devices 80 and 82, as best illustrated in FIGS. 2 and 3. The pivot devices 80, 82 are designed to support the bridges 78 for pivotable movement toward either side of the railcar 12 and are also adapted to effect raising and lowering of the bridges 78 in order to accommodate various types of loading and unloading situations. For example, the pivot devices 80, 82 are designed to raise and lower the bridges 78 with respect to the upper surface 20 of the cargo bed 18 so that when the bridges 78 are pivoted outwardly preparatory to loading or unloading the container 22, the outer ends of said bridges 78 will not inadvertently engage or otherwise interfere with any adjacent docking facilities, such as the loading dock or ramp 84 illustrated in FIGS. 1 and 4.

Each of the transfer bridges 78 is adapted to be selectively biased between its transit position wherein it is colinearly disposed along the centerline of the car 12, and the various extended positions wherein it serves to support the container 22 during loading or unloading thereof, by means of a drive chain located interiorly of the cargo bed 18 and one of which is shown in FIG. 1 and designated by the numeral 86. The chain 86 is drivingly connected with a suitable sprocket 88 located on the lower end of the pivot device 80, the chain 86 also being operatively connected to suitable drive sprocket 90 having a drive shaft 92 which extends upwardly from the upper surface 20 of the cargo bed 18. The drive shaft 92, along with a similar shaft 93 associated with a drive chain (not shown) for the pivot device 82, is adapted to be selectively engaged with a suitable portable drive motor or tool, such as the aforementioned motor or tool 76, whereby to effect rotative movement of the chain 86 and hence rotation of the pivot device 80, resulting in preselected pivotal movement of the associated transfer bridge 78.

The lower side of the container bottom 26 is provided with a plurality of rollers, generally designated 94, adjacent the opposite ends of the container 22, which rollers 94 are designed to permit the container 22 to roll freely along the upper sides of the transfer bridges 78 between the transit and loading or unloading positions shown in FIGS. 2 and 3. In order to assist moving the pivotal or free end(s) of the container 22 toward and away from the transit position T along the upper sides of the transfer bridges 78, each of the bridges 78 is provided with an internal transfer mechanism in the form of a pair of rotatable sprocket members 96 and 98 which have a suitable drive chain or the like 100 rotatably mounted thereon. The drive chains 100 are each designed to carry a bayonnet-type dog assembly 102 adapted to slide along elongated recesses 104 formed in the sides of the transfer bridges 78. Each of the assemblies 102 comprises an upwardly extending dog 106 adapted to be received within a suitable opening or recess 107 provided in the lower side of the container 22, with the result that as the assemblies 102 moves longitudinally of the bridges 78, the adjacent end of the container 22 will be biased toward or away from the outer or free end of the bridges 78, as illustrated in FIG. 1. In order to achieve longitudinal movement of the dog assemblies 102 and hence the desired positioning of the container 22, the sprocket members 96 are drivingly connected by means of suitable gear trains or the like (not shown) to drive shafts 108 that extend outwardly from the bridges 78 and are adapted to be driven by a suitable portable drive motor or tool such as that shown at 76 in FIG. 1. Thus, upon proper rotation of the drive shafts 108, the drive chains 100 will be rotated about the sprockets 96, 98, and the dog assemblies 102 will move longitudinally of the bridges 78 to effect the desired pivotal movement of the container 22 relative to the railway car 12.

Referring now to the overall operation of the loading and unloading system 10 of the present invention, after such time as the railway car 12 has been positioned adjacent a suitable loading or unloading facility, and it is determined which end of the container 22 cargo is to be loaded into or unloaded from, the transfer bridge member 78 adjacent that particular end of the container 22 is properly elevated so that it may be pivoted outwardly to a position overlying the adjacent facility, such as the dock 84. Thereafter, the drive shaft 92 associated with this transfer bridge 78 is actuated by means of suitable motor or the like, resulting in the bridge 78 being biased from its transit position to its loading or unloading position. It will be noted that the height of the transfer bridges 78 are somewhat less than the height of the elevatable pivot mechanisms 68, whereby the bridges 78 may be pivoted relative to the car 12 without interfering with the lower side of the container 22 which is supported on the mechanisms 68.

After the proper transfer bridge 78 has been extended to some predetermined position, three of the pivot hub members 72 are retracted through suitable actuation of the associated drive shafts 74, whereby the container 22 is supported for pivotal movement upon the hub member 72 which remains extended into the lower side of the container 22. Thereafter, the dog member 106 on the extended bridge 78 is engaged with the lower side of the container 22 and the associated drive shaft 108 is properly actuated, resulting in the adjacent end of the container 22 being pivoted outwardly along the rollers 94 on the lower side of the container 22 and about the pivotal axis provided by the aforesaid extended hub member 72, with the result that the container 22 is disposed in a loading or unloading position as shown, for example, by the solid line position in FIG. 1.

After cargo has been loaded onto or unloaded from the container 22, the outwardly extending end of the container 22 may be pivoted back to its transit position upon proper actuation of the associated drive shaft 108 and longitudinal movement of the dog assembly 102 toward the innermost end of the extended bridge 78. Thereafter, the retracted hub members 72 may be extended to positively secure the container 22 onto the car 12, and the extended transfer bridge 78 may be biased to it respective transit position upon proper actuation of the associated drive shaft 92, thereby preparing the entire system 10 for subsequent transit along the tracks 14.

Referring now to FIGS. 6 and 7, a slightly modified embodiment of the railcar-loading and -unloading system 10 is shown as comprising a cargo-carrying container 22' which is adapted to be mounted upon a railcar 12' having a generally flat, horizontally extending cargo bed 18'. Generally speaking, the container 22' and railcar 12' are of substantially the same constructions as the components identified by like numerals in FIGS. 1—5, with the container 22' being supported upon the cargo bed 18' by a plurality of elevatable pivot mechanisms (not shown) that are preferably of the same construction and operation as the aforedescribed mechanisms 68. Thus, the container 22' is adapted to be pivotably biased from its normal transit position shown in phantom in FIG. 6 to any one of the four loading or unloading positions to which the aforedescribed containers 22 could be positioned, as previously described in connection with FIGS. 2 and 3.

The essential difference between the construction shown in FIGS. 6 and 7 and the arrangement heretofore described in connection with FIGS. 1—5 resides in a modified construction of the shiftable beams or transfer bridges utilized in supporting the container 22' when it is disposed in any one of its loading or unloading positions. As best illustrated in FIG. 6, the means for supporting the outer or free end(s) of the container 22' as the same is pivoted to a loading or unloading position is provided by an elongated rail or track member 110 that is adapted to be detachably secured to the end of the container 22' which is to be pivoted outwardly from the railcar 12'. The track member 110 comprises a lower mounting section 112 and an upwardly and outwardly, generally V-shaped section 114 that defines an elongated channel 116 coextensive of the track 110. The track 110 is adapted to be detachably secured to either end of the container 22' by having a pair of outwardly extending boss portions 118 formed on the mounting section 112 thereof inserted into suitable complementary-shaped apertures 120 formed in a pair of corner castings 122 affixed to the lower corners of the container 22'. Suitable locking means such as the locking key 124 illustrated in FIG. 7 may be operatively inserted through central openings 126 in the boss portions 118 for lockingly securing the track 110 to the casting 122 and thereby assuring against any relative movement of the track 110 with respect to the container 22'. As will be apparent, the track may be easily detached and attached to the ends of the container 22' to provide for storage thereof during periods of transit.

When it is desired to pivotably bias the container 22' to a loading or unloading position, the track 110 is adapted to ride upon and be supported by a pair of portable elevatable stands or dollies, two of which are shown in FIG. 6 and generally designated by the numeral 128. The dollies 128 comprise generally flat, horizontally extending base sections 130 and upwardly extending, generally tubular support sections 132. Adjustably disposed within the support section 132 of each of the dollies 128 is a rigid support member 134 which is provided with an annular wheel or roller 136 at the upper end thereof. As shown in FIG. 7, the wheels 136 are adapted to be received within an engage the elongated channel 116 defined along the upper end of the track 110, whereby the track 110, and hence the container 22' attached thereto, is free to ride along the wheels 136 and thus be biased, for example, between the solid and phantom line positions shown in FIG. 6. The support members 134 and associated support sections 132 of each of the dollies 128 may be and preferably are provided with a series of openings, generally designated 138, which, when properly aligned, are adapted to receive a suitable locking pin or the like 140 to adjustably secure the support members 134 at a preselected elevated position within the dollies 128. Accordingly, the dollies 128 may be conveniently adjusted to accommodate various terrain or dock elevations so that the track 110 will remain substantially horizontally and level with the cargo bed 18' as the container 22' is biased relative to the railway car 12'. If desired, the dollies 128 may be provided with suitable hydraulic or similar type jacks interiorly thereof for raising and lowering the support members 134 relative to the support sections 132, whereby one end or the other of the track 110 may be raised or lowered so that the container 22' can be moved between its transit and loading or unloading positions under the influence of gravity.

In operation, after such time as the railway car 12' is properly located with respect to some predetermined loading facility, the track 110 is fixedly attached to the end of the container 22' through which cargo is be loaded or unloaded.

Thereafter, the dollies 128 are properly positioned, one directly adjacent the cargo bed 18' and the other spaced outwardly some predetermined distance from the first dolly, as shown in FIG. 6. Three of the pivot mechanisms which support and secure the container 22' on the railway car 12' are then actuated so as to retract the hub members thereof, thus leaving the container 22' supported for pivotal movement upon the remaining extended hub member. The free end of the container 22' is then pivoted outwardly, whereby the track 110 will ride upon the wheels 136 on the upper ends of the dollies 128 from the position shown in phantom lines in FIG. 6 to the solid line position in this FIG., at which time the desired loading or unloading of the container 22' may be effected. After the necessary loading and unloading has been completed, the container 22' may be pivoted back to its transit position, and the elevatable mechanisms may be actuated so as to lockingly secure the container 22' on the car 12'. Thereafter, the track 110 may be removed from the end of the container 22' and may be placed in a storage location along with the dollies 128. It will be noted that the same track 110 and dollies 128 may be utilized for successively loading or unloading each of a series of containers 22', thereby minimizing to the extreme the equipment necessary for supporting such containers when they are disposed in their loading or unloading positions.

Referring now to FIGS. 8 and 9, a railcar-loading and -unloading system 220, in accordance with another embodiment of the present invention, is shown as comprising a wheeled vehicle 202 in the form of a railcar which is adapted to ride upon conventional railway tracks 204 and be operatively connected to similar or different type railcars in the usual manner through a suitable coupling mechanism 206 located at the opposite ends thereof. The car 202 may be of any suitable construction, such as a "flatcar" or the like and comprises a generally horizontally extending cargo bed 208 defining a generally horizontally extending surface 210. The car 202 is shown as being provided with a pair of longitudinally aligned, generally rectangular-shaped cargo-carrying containers 212 which may be and preferably are of the same construction as the aforedescribed containers 22 and 22' and comprise upper side sections or tops 214, lower side sections or bottoms 216, and laterally spaced, longitudinally extending and vertically disposed side sections 218, 220. The longitudinally opposite ends of the containers 212 are adapted to be selectively closed by means of suitable closure panels or doors 222 that may be hingedly mounted adjacent the laterally outer sides thereof by means of suitable hinge mechanisms or the like 224 and be provided with conventional locking or latching mechanisms 226. It will be noted that although the car 202 is provided with two of the cargo-carrying containers 212, the present invention is not intended to be limited to such a construction, and that since the hereinafter to be described structure for pivotably biasing the containers 212 between transit and loading and unloading positions is preferably identical for each of the containers 212, such structure will be described only in connection with one of the containers 212 for purposes of simplicity of disclosure.

Generally speaking, the cargo container(s) 212 is adapted to be pivotably biased between the various positions shown in FIGS. 2 and 3, i.e., the various loading and unloading positions A, B, C and D in a manner similar to the way in which the containers 22 and 22' were moved relative to the rail cars 12 and 12'; however, the rail car 202 differs from the cars 12 and 12' in that instead of utilizing the transfer bridges 78 or track members 110, the railcar 202 utilizes an elongated flexible member or cable means and an associated winch assembly for selectively biasing the cargo container 212 between its transit position and various loading or unloading positions, as will hereinafter be described in detail.

The bottom section 216 of the cargo-carrying container 212 is provided with a pair of transfer bolsters, generally designated 228 which are provided with upwardly extending fastening tangs 230, 232 adjacent the laterally outer ends thereof. The tangs 230, 232 of each of the bolsters 228 are adapted to be inserted into and fixedly secured within a pair of corner castings, generally designated 234 which are located at each end of the container 212, whereby to fixedly secure the bolsters 228 to the container 212. The bolsters 228 comprise longitudinally extending support sections 236 which project longitudinally outwardly from the longitudinally opposite ends of the container 212 and are provided with upwardly extending cable engaging fittings or dogs, generally designated 238. Each of the bolsters 228 is also provided with a longitudinally extending pivot fitting 240 defining a generally vertically extending opening or bore 242 within which a suitable pivot pin, shaft or the like (not shown) may be received for pivotably connecting the opposite ends of the container 212 to the car 202.

As illustrated in FIG. 8, the longitudinally opposite ends of the car 202 are provided with a pair of laterally extending longitudinally spaced fixed bolster assemblies, generally designated 244, which assemblies 244 are adapted to be secured by any suitable means to the surface 210 of the cargo bed 208 at positions in general longitudinal alignment with the transfer bolsters 228 on the opposite ends of the containers 212. Each of the bolsters 244 is provided with a pivot fitting 246 on the upper side thereof which fittings 246 are adapted to cooperate with the fittings 240 on the bolsters 228 for receiving suitable pivot pin means for pivotably connecting the containers 212 to the car 202. The bolster assemblies 244 are also provided with a rotatable sheave mechanism, generally designated 248, which are adapted to be rotatable upon generally vertically disposed support shafts 250 and be adapted to rotatably support a transfer cable, generally designated 252, in a manner hereinafter to be described for purposes of selectively biasing the container 212 between its transit position and loading or unloading positions.

The cable member 252 may be of any suitable relatively flexible construction, as is well known in the art, so as to be adapted for longitudinal tensioning for selectively positioning the cargo-carrying container 212. The cable 252 is adapted to be selectively wound or reeled upon a winch assembly, generally designated 254, associated with the system 200 and disposed upon a loading or unloading dock structure 256 which extends along one side of the railway tracks 204. The winch assembly 254 comprises a base structure 258 that is supported for longitudinal rolling movement along the upper surface of the dock structure 256 by means of a plurality of wheeled castor assemblies, generally designed 260. Disposed upon the base structure 258 is a rotatable cable winding reel 262 adapted to have the cable 252 wound thereon in a manner well known in the art. The reel 262 is provided with a drive gear 264 and a cooperable pinion gear 266 mounted on a drive shaft 268, whereby rotation of the shaft 268 effects simultaneous rotation of the gears 266, 264 and hence rotation of the entire reel 262. Motive power for selectively rotating the shaft 268 may be provided by a suitable drive motor, tool or the like, such as the aforedescribed tool 76.

The winch assembly 254 is supported for longitudinal movement relative to the railway tracks 204 and the car 202 thereon by means of a longitudinally extending guideway or track 270 that is spaced laterally outwardly from the tracks 204, as shown in FIG. 8. The track 270 may be of any suitable construction adapted to cooperate with an associated guideway structure 272 on the lower side of the assembly 254, whereby to guide the winch assembly 254 for longitudinal movement along the dock structure 256, the track 270 and guideway structure 272 further cooperating to resist movement of the entire winch assembly 254 toward the railway tracks 204 upon tensioning of the cable 252 as will occur when the same is wound upon the reel 262.

If desired, the dock structure 256 may be provided with a generally flat or planar skid plate 274 on the upper side thereof upon which the end of the container 212 which is pivoted to and from its loading or unloading position may ride. It will be apparent, of course, that the underside of the container 212 may be provided with suitable antifriction roller means, wheels, casters or the like, whereby to reduce the frictional resistance between the underside of the container 212 and the upper side of the dock structure 256 as the container 212 is biased or selectively positioned relative thereto.

The car 202 may be provided with one or more stabilizing means, generally designated 276, adapted to be interposed between the confronting sides of the car 202 and dock structure 256 to stabilize the car 202 as the containers 212 are moved relative thereto. Although the mechanisms 276 may be or various constructions, in the embodiment shown in FIGS. 8 and 9, the mechanism 276 comprises a pair of relatively extendable sections 278 and 280 which may be interengaged by any suitable means, such as being pivotably or telescopically connected to one another. The laterally outer end of the section 278 is preferably provided with a bearing pad or plate 282, as is the outer end of the section 280 provided with a bearing pad or plate 284 adapted to bear against the confronting sides of the car 202 and dock structure 256. Means in the form of a suitable actuating device 286 may be provided on the mechanism 276 for effecting relative expanding movement of the sections 278, 280 thereof, which device 286 may be driven by any suitable means, such as the tool 76 and may be operatively connected to the sections 278, 280 through suitable actuating linkage means, drivescrews or power assisted piston and cylinder assemblies or the like, as will be apparent to the skilled artisian.

In operation, after such time as the railway car 202 is positioned adjacent a suitable loading or unloading facility, such as the dock structure 256, and it is determined which end of the containers 212 thereof cargo is to be loaded into or unloaded from, the winch assembly 254 is traversed longitudinally of the track 270 adjacent the end of one of the containers 212 to be pivoted to a loading or unloading position, and the pivot pin or the like associated with the pivot fittings 240, 246 at that particular end of the container 212 is removed. Thereafter, a section of the cable 252 is unwound from the reel 262 and engaged or connected to the dog 238 adjacent the side of the container 212 facing the direction of pivotal movement of the container 212; in the arrangement shown in FIG. 8, the end of the cable 252 is connected to the dog 238 adjacent the side section 220. Before the cable is tensioned, for example via actuation of the tool 76, the skid plate or the like 274 may be placed upon the upper surface of the dock structure 256, and one or more of the stabilizing mechanisms 276 may be provided interjacent the car 202 and confronting surface of the structure 256. After the car 202 has been properly stabilized, the cable 252 may be wound upon the reel 262, resulting in the container 212 being pivotably biased from its normal transit position overlying the cargo bed 208 to its loading or unloading position. After the one container has been thus positioned for loading or unloading, the winch assembly 254 may be traversed along the track 270 to a position adjacent the end of the other of the containers 212, at which time the aforesaid procedure may be followed to bias said other container 212 to its respective loading or unloading position.

At such time as cargo has been loaded into or unloaded from the containers 212, the cable 252 is slackened and positioned around the periphery of the associated sheave 248. Thereafter the cable 252 may be tensioned or wound upon the reel 262 thereby causing the container 212 to be pivoted from its loading or unloading position back toward its transit position overlying the cargo bed 208, after which time suitable fastening means such as the aforesaid pivot pin means or the like may be inserted or engaged with the fittings 240, 246 to secure the container 212 in place. Upon thereafter removing the stabilizing mechanism(s) 276, the entire system 200 will be prepared for subsequent transit along the tracks 204.

It will be seen from the foregoing description that the present invention provides a new and improved system for conveniently loading and unloading railway vehicles. It will be noted, however, that the present invention is not necessarily limited solely to the railway transit art since it is contemplated that the principles of the present invention will also find particularly useful application in highway and similar type vehicles. Also, it will be noted that by virtue of the fact that the cargo-carrying containers may be biased in either direction from the associated vehicle, as well as at both ends thereof, the loading and unloading system of the present invention will find universality of application and unlimited use.

While it will be apparent that the embodiments illustrated herein are well calculated to fulfill the objects above stated, it will be appreciated that the present invention is susceptible to modification, variation and change without departing from the proper scope or fair meaning of the subjoined claims.

I claim:

1. In a loading and unloading system for a railway vehicle adapted to travel along a railroad track and having a flat, generally horizontally extending cargo bed and a cargo-carrying container adapted to be supported on the cargo bed, with the container being adapted to be loaded and unloaded from an associated loading and unloading dock structure disposed adjacent the railroad track, the improvements comprising, means for supporting the container for pivotal movement relative to the cargo bed about at least one vertical axis, whereby one end of the container may be pivoted between a transit position substantially overlying the cargo bed and at least one loading or unloading position wherein the one end of the container extends outwardly from the vehicle to provide for convenient end loading and unloading thereof, means including an elongated relatively flexible member for moving said one end of said container between said transit and loading or unloading positions, winch means for selectively tensioning said last-mentioned member, whereby the same will cause said container to be moved between said transit and loading or unloading positions, and means for operatively supporting said winch means at a location spaced laterally outboard of the vehicle, said last-mentioned means including means on said dock structure providing for adjustable movement of said winch means longitudinally of said railroad track, whereby said flexible member may be connected directly between one end of said container and said winch for pivoting said one end of said container toward said loading or unloading position.

2. A loading and unloading system as defined in claim 1 which includes stabilizing means for stabilizing the vehicle as the cargo-carrying container is moved between said transit and said loading and unloading positions.

3. A loading and unloading system as defined in claim 2 wherein said stabilizing means includes means interposed between the vehicle and an associated loading or unloading dock structure for stabilizing said vehicle against lateral movement thereof upon relative movement of said container between said transit and said loading or unloading positions.

4. A loading and unloading system as defined in claim 1 wherein said flexible member comprises an elongated cable means adapted for engagement at one portion thereof with the container end at another portion thereof with said winch means, whereby actuation of said winch means provides tensioning of said cable means to bias said container between said transit and loading or unloading conditions.

5. A loading and unloading system as defined in claim 4 wherein said container includes fastening means adjacent that laterally outer sides thereof adapted for connection with said cable means, whereby tensioning of said cable means on the opposite sides of said container effects pivotal movement thereof between said transit and loading or unloading positions.

6. A loading and unloading system as defined in claim 4 wherein said winch means includes a rotatable reel and power means for rotating said reel and winding said cable means thereon.

7. A loading and unloading system as defined in claim 1 which includes skid plate means for supporting said one end of said container upon an associated loading or unloading dock structure as said container is pivoted between said transit and said loading or unloading positions.

8. A loading and unloading system as defined in claim 1 wherein said stabilizing means includes means interposed between the vehicle and said associated loading or unloading dock structure for stabilizing said vehicle against lateral movement thereof upon relative movement of said container between said transit and said loading or unloading positions, and wherein said container includes fastening means adjacent the laterally outer sides thereof adapted for connection with said cable means, whereby tensioning of said cable means on the opposite sides of said container effects pivotal movement thereof between said transit and loading or unloading positions.

9. A loading and unloading system as defined in claim 1 wherein said stabilizing means includes means interposed between the vehicle and said associated loading or unloading dock structure for stabilizing said vehicle against lateral movement thereof upon relative movement of said container between said transit and said loading or unloading positions, and wherein said winch means includes a rotatable reel and power means for rotating said reel and winding said cable means thereon.

10. A loading and unloading system as defined in claim 1 which includes stabilizing means for stabilizing the vehicle as the cargo-carrying container is moved between said transit and said loading and unloading positions, wherein said stabilizing means includes means interposed between the vehicle and an associated loading or unloading dock structure for stabilizing said vehicle against lateral movement thereof upon relative movement of said container between said transit and said loading or unloading positions, which includes guideway means comprising track means provided on a loading and unloading dock and adapted to support the winch means for longitudinal movement along the vehicle, wherein said container includes fastening means adjacent the laterally outer sides thereof adapted for connection with said cable means, whereby tensioning of said cable means on the opposite sides of said container effects pivotal movement thereof between said transit and loading or unloading positions.

11. In a loading and unloading system for a vehicle having a flat, generally horizontally extending cargo bed and a cargo-carrying container adapted to be supported on the cargo bed, the improvements comprising,
means for supporting the container for pivotal movement relative to the cargo bed about at least one vertical axis, whereby one end of the container may be pivoted between a transit position substantially overlying the cargo bed and at least one loading or unloading position wherein the one end of the container extends outwardly from the vehicle to provide for convenient end loading and unloading thereof,
means including an elongated relatively flexible member for moving said one end said container between said transit and loading or unloading positions,
winch means movable longitudinally of the vehicle for selectively tensioning said last-mentioned member, whereby the same will cause said container to be moved between said transit and loading or unloading positions, and
guideway means for guiding said winch means for longitudinal movement thereof along said vehicle.

12. In a loading and unloading system for a vehicle having a flat, generally horizontally extending cargo bed and a cargo-carrying container adapted to be supported on the cargo bed, the improvements comprising,
means for supporting the container for pivotal movement relative to the cargo bed about at least one vertical axis, whereby one end of the container may be pivoted between a transit position substantially overlying the cargo bed and at least one loading or unloading position wherein the one end of the container extends outwardly from the vehicle to provide for convenient end loading and unloading thereof,
means including an elongated relatively flexible member for moving said one end of said container between said transit and loading or unloading positions,
winch means movable longitudinally of the vehicle for selectively tensioning said last-mentioned member, whereby the same will cause said container to be moved between said transit and loading or unloading positions, and
guideway means for guiding said winch means for longitudinal movement thereof along said vehicle and comprising track means provided on a loading and unloading dock and adapted to support the winch means for said longitudinal movement along the vehicle.

13. In a loading and unloading system for a vehicle having a flat, generally horizontally extending cargo bed and a cargo-carrying container adapted to be supported on the cargo bed, the improvements comprising,
means for supporting the container for pivotal movement relative to the cargo bed about at least one vertical axis, whereby one end of the container may be pivoted between a transit position substantially overlying the cargo bed and at least one loading or unloading position wherein the one end of the container extends outwardly from the vehicle to provide for convenient end loading and unloading thereof,
means including an elongated relatively flexible member for moving said one end of said container between said transit and loading or unloading positions,
winch means for selectively tensioning said last-mentioned member, whereby the same will cause said container to be moved between said transit and loading or unloading position.
stabilizing means for stabilizing the vehicle as the cargo-carrying container is moved between said transit and said loading and unloading positions, and
guideway means for guiding said winch means for longitudinal movement thereof along said vehicle.

14. In a loading and unloading system for a railroad car having a flat, generally horizontally extending cargo bed and a cargo-carrying container adapted to be supported on the cargo bed, the improvements comprising,
means for supporting the container for pivotal movement relative to the cargo bed about at least one vertical axis, whereby one end of the container may be pivoted between a transit position substantially overlying the cargo bed and at least one loading or unloading position wherein the one end of the container extends outwardly from the car to provide for convenient end loading and unloading thereof,
means including an elongated relatively flexible member for moving said one end of said container between said transit and loading or unloading positions, and
winch means for selectively tensioning said last-mentioned member, whereby the same will cause said container to be moved between said transit and loading or unloading positions,
said flexible member comprising an elongated cable means adapted for engagement at one portion thereof with the container end at another portion thereof with said winch means, whereby actuation of said winch means provides tensioning means to bias said container between said transit and loading or unloading conditions,
fastening means adjacent the laterally outer sides of said container adapted for connection with said cable means, whereby tensioning of said cable means on the opposite sides of said container effects pivotal movement thereof between said transit and loading or unloading positions,
guideway means for guiding said winch means for longitudinal movement thereof along said car.